C. F. JENKINS.
MOTION PICTURE APPARATUS.
APPLICATION FILED SEPT. 21, 1911.
1,017,672.
Patented Feb. 20, 1912.
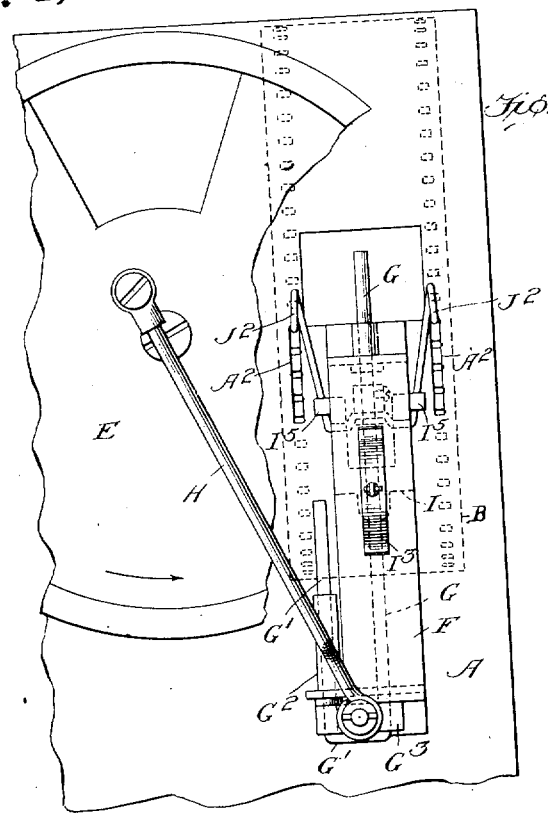
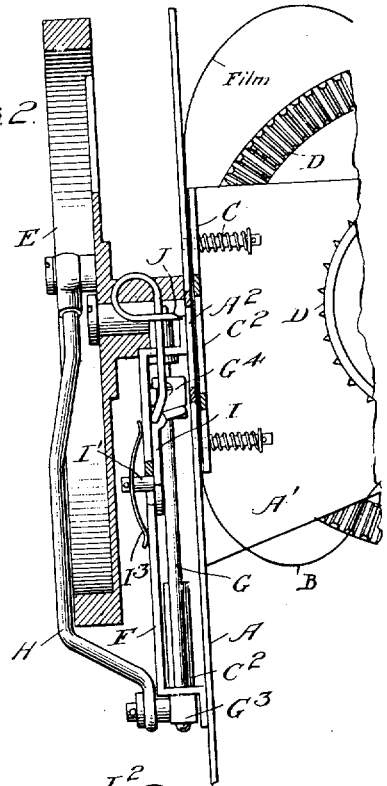
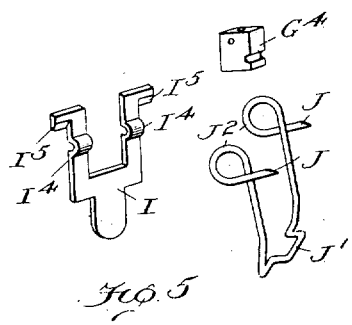
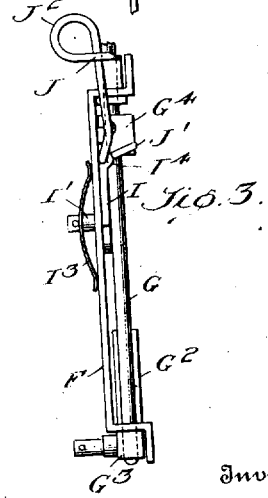
Witnesses
Edwin L. Bradford
Wm O. Dyre
Inventor
C. F. Jenkins
By Wallace Greene,
Attorney

UNITED STATES PATENT OFFICE.

CHARLES FRANCIS JENKINS, OF WASHINGTON, DISTRICT OF COLUMBIA.

MOTION-PICTURE APPARATUS.

1,017,672.  Specification of Letters Patent.  Patented Feb. 20, 1912.

Application filed September 21, 1911. Serial No. 650,629.

*To all whom it may concern:*

Be it known that I, CHARLES FRANCIS JENKINS, citizen of the United States, residing at Washington, in the District of Columbia, have invented certain new and useful Improvements in Motion-Picture Apparatus, of which the following is a specification, reference being had therein to the accompanying drawing.

In motion picture apparatus such as provides for intermittent movement of a film strip it is important and has proved very difficult to arrest the film movement at precisely the right point after each step.

The general object of this invention is to provide for securing perfect accuracy when the film is accurately perforated and in good condition. This result is secured by providing a slightly yieldable film engaging device and moving this against a rigid stop placed in its path.

In the accompanying drawings, Figure 1 shows in front elevation film feeding devices involving this invention. Fig. 2 is a side elevation of the same devices, different portions being broken away in different planes perpendicular to the line of sight. Fig. 3 is a view similar to Fig. 2, certain parts, however, being omitted. Fig. 4 is a perspective view of a portion of the devices seen in Figs. 1, 2, 3. Fig. 5 shows in perspective members seen assembled in Fig. 4.

In these figures, A represents ordinary plate members of the usual casing which supports the working parts of the apparatus, the transverse member being provided with an ordinary exposure opening across which the film B is fed while held against the plate member by a common spring clamp C. In this instance, the film is fed and taken up by sprocket drum device D without novelty, the arrangement being such that the ordinary slack or loop is formed above and below the exposure opening. In front of the opening is mounted a common rotary shutter E, driven from the sprocket devices in the usual manner, and between the transverse plate and the shutter is a long bracket F having its central body portion parallel to the plate and at some distance therefrom and its offset ends rigidly fixed to the plate. A rod G is mounted in suitable bearings in the bracket to slide longitudinally.

In the construction illustrated, the rod is bent to U-shape and the branch G' parallel to the main portion of the rod, is arranged to slide in a long bearing $G^2$. To the lower end portion of the rod is fixed a block $G^3$ which is connected to the shutter by a pitman H in order that the rotation of the shutter may reciprocate the rod. Upon the inner face of the body of the bracket is a sliding plate I from which a stud I' projects through a slot in the bracket and bears a friction spring $I^3$ which tends to hold the plate I in any position it may have upon the bracket. The film is engaged and advanced periodically by spurs J, here shown as the end portions of a rod bent to U-shape and mounted to rock in bearings $I^4$ in the plate I and having below a central offset J' engaging in a groove in a block $G^4$ fixed to the rod G below its upper bearing. The two branches of the rod are preferably coiled to form strong springs $J^2$ which allow the spurs to yield vertically.

In Figs. 1, 2, 3, the rod G and block $G^4$ are shown at approximately their highest point the spurs being retracted and outside the plane of the film. As the shutter moves from its corresponding position, the rod and block $G^4$ begin to descend, and since the plate I is frictionally held, the spur rod is rocked in its bearings $I^4$ and the spurs are suddenly moved into slots $A^2$ in the frame plate, through the perforations in the film, and into slots $C^2$ in the clamp C. This movement of the spurs is arrested when the body of the spur rod meets the plate A or by any suitable stop. In the further movement of the sliding rod, the friction resisting the movement of the plate I is overcome and this plate, the spur rod and the film are carried onward. Slightly before the rod reaches its lowest limit of movement, the spurs strike the lower wall of their slot and are arrested, always at exactly the same point, the spring spurs yielding slightly while the sliding rod continues to its lowest point. It may be observed that the speed of the sliding rod is reduced almost to zero before the spurs strike their stop, and that even the slight blow upon the stop is cushioned because the spurs yield. The plate I being now at its lowest point, friction resists its return movement, and hence the first effect of the return movement of the block $G^4$ is to rock the spur rod and withdraw the spurs from the film and slots, the retracting movement being arrested by stops I⁵ upon the plate I, after which the plate and rod accompany the rod G and return to initial position.

What I claim is:

1. In apparatus of the class described, the combination with a yielding reciprocating film feeding device, of a stop arranged to limit, positively, the film-advancing movement of said device.

2. In apparatus of the class described, the combination with a suitable film guide, of a film engaging device, means for reciprocating said device, a stop positively limiting the advance movements of said device, and means whereby force imparting reciprocating movement to said device causes it to engage the film before advancing and release the film before retreating.

3. In apparatus of the class described, the combination with a reciprocating film engaging device adapted to yield when in its advance it meets strong resistance, a stop in and near the end of the path through which said device advances, and means for reciprocating said device.

4. In apparatus of the class described, the combination with means for guiding a perforated film, of spurred reciprocating devices arranged to advance said film step by step and adapted to yield when meeting strong resistance to film advancing movement, means for causing said devices to engage and disengage the film alternately, and an unyielding stop in position to limit the film-advancing movement of said devices.

In testimony whereof I affix my signature in presence of two witnesses.

CHARLES FRANCIS JENKINS.

Witnesses:
A. J. MAXFIELD,
HELEN G. DALEY.